United States Patent [19]
O'Hare

[11] 4,087,735
[45] May 2, 1978

[54] SOLAR ELECTRIC GENERATION USING VARIABLE CAPACITORS

[76] Inventor: Louis O'Hare, 1041 Ponderosa, Apt. 2, Fort Collins, Colo. 80521

[21] Appl. No.: 663,927

[22] Filed: Mar. 4, 1976

[51] Int. Cl.² .......................... H02N 1/00; G01T 1/00
[52] U.S. Cl. .............................. 322/2 A; 250/211 R; 310/308; 320/1
[58] Field of Search .................. 322/2 A; 310/4, 5, 6; 250/211 R, 338, 336, 388, 370; 317/246; 320/1

[56] References Cited
U.S. PATENT DOCUMENTS

| | | |
|---|---|---|
| 1,899,026 | 2/1933 | Fessenden .................. 317/246 X |
| 3,094,653 | 6/1963 | Le May et al. .................. 322/2 A |
| 3,300,644 | 1/1967 | Zemel et al. .................. 250/211 R |
| 3,426,209 | 2/1969 | Sihvonen et al. .................. 250/211 R |

Primary Examiner—Robert J. Hickey

[57] ABSTRACT

The generation of electricity from radiant energy by means of effective dielectric constant changes in a light or radiation sensitive dielectric of a condenser in series with a charged condenser and a transformer is improved when both of the circuits' condensers are made light variable condensers and when a special shuttering arrangement prevents waste and loss of concentrated radiation by special placement and additional electric circuitry.

6 Claims, 11 Drawing Figures

SOLAR ELECTRIC GENERATION USING VARIABLE CAPACITORS

This present invention is a type of electric generator in that it converts radiant energy to useful electric power. It is an electric generator which operates on the principle of changing electric capacitance in which electric capacitance is constantly changing under the influence of intermittent light energy. A light-variable capacitor or radiation-variable capacitor interacts with radiation made to pulsate in order to produce an alternating current flow. Specifically, the changing voltage across a condenser (whose dielectric is a dielectric of variable dielectric constant) is caused to rise and fall when radiation of variable intensity is incedent upon this condenser's dielectric. In turn the rising and falling voltage of this condenser produces a current flow in a transformer and finally a useful power is produced in the secondary winding of the transformer. The prior art can be found in a patent application Ser. No. 338,088 filed Mar. 5, 1973, now U.S. Pat. No. 3,971,938, called Variable Polarizability Capacity Generator by Louis O'Hare. My present invention relates to that invention in that my present invention is an improvement of the former. It is an improvement specifically in the manner and by the means used to pulsate the incident radiation upon the light-sensitive dielectric of the light-variable condenser. In the patent application mentioned the fundamental operating mechanism requires pulsating radiation or pulses of radiant energy. This present invention also has that requirement and does not differ in that respect. However, the former invention is wasteful of radiation incident upon it because for a period of time in each cycle the shutter which periodically impedes radiation from the dielectric merely absorbs or reflects radiation during that time period. Accordingly, during that time period concentrated and/or collected radiation is wasted at the shutter. In the present invention then the problem of waste radiation is solved by a more suitable means of shuttering or interrupting radiation to the effect that the particular radiation which would otherwise be absorbed by the shutter is used to produce useful current. To achieve this a condenser requisite to the basic mechanism of the circuit and serving as a charge reservoir now in this present invention is replaced by a light-variable condenser serving the former function but now acting as well to impart energy to the circuit during the time period energy would be wasted in the former invention. In that former invention a fixed condenser acted in series circuitry with a light-variable condenser so that a capacitive charge was shared by both condensers and the proportion of the total charge held by each varies in time depending upon the value of the variable condenser at that time. Since the charge is caused to move depending upon the changing distribution of the total charge between the two condensers, the energy which moves a share of the charge back and forth between the two condensers is made to do useful work when directed through the winding of a transformer placed in series circuitry with those condensers. Accordingly, this present invention improves the former by establishing an additional advantageous relationship between two condensers and a transformer in a series circuit which circuit is an isolated circuit except for brief charging periods. In this present invention instead of only one of the two condensers being a variable-light reacting condenser both condensers are light or radiation-variable. Instead of one condenser acting alone to have temporarily elevated its voltage relative to a fixed condenser's voltage now there are two variable condensers and this second light variable condenser here in place of the fixed condenser sees its own voltage lowering dynamically by a dynamic reaction of radiation interacting with the dielectric precisely in time as voltage of the first variable condenser is elevating as light moves from its dielectric to the dielectric of this variable condenser. The total effect is that the light which is collected is in this present invention never merely impeded from striking a light-variable condenser during a dark period but rather the collected light is always acting either with one or the other of those condensers to impart energy to the circuit by cycling back and forth between the two condensers.

In the former art cited above a single light-variable condenser shared a charge with and electrically interacted with a fixed condenser. Now two light-variable condensers are interacting together. In this invention two light-variable condensers are connected in series with a high voltage transformer. Each condenser is in series with each other and with the transformer and a high voltage exciting charge is placed on one of the condensers. The source of the charge is removed generally from the circuit but may occasionally be used as an exciter to replace any lost charge. When the source is removed the charge distributes itself between the two condensers. Light or other radiation is incidented upon the light-sensitive dielectric of one of the light-variable condensers and light is impeded from the other light-variable condenser. The electric capacitance of the condenser without the light is less under this condition than the capacitance of the condenser with the light striking it. This is true because the dielectric of both condensers is of such material that the effective dielectric constant is increased when light is incident upon it. In the present circuit then a part of the total charge distribution as shared between the two capacitors is distributed to the capacitor which has an elevated capacitance i.e. a capacitance larger than it would have without the light. Then in a subsequent time period light is removed from this first light-variable condenser and as light is removed the dielectric constant value of this condensers dielectric now diminishes, and the capacitance consequently diminishes. At this time period this first condenser's particular charge is being held in the condenser by diminishing electric capacitance. With reduced capacitance this precise charge can only exist by means of elevating voltage; hence, the voltage on this condenser elevates the way voltage elevates when one pulls apart the plates of a charged condenser reducing its capacity and raising its voltage. In the circuit the increase in voltage of the first condenser relative to the voltage of the second condenser causes a portion of this condensers charge to move to the second condenser through the series circuit. This charge movement here in this present invention has an augmentation innovative over the former art in that the movement of the charge is reinforced by the advantageous depression in voltage of the second variable condenser since this capacitors capacitance is increasing during this period as it begins to receive light and to undergo an elevation in its effective dielectric constant.

The same ray or concentration of light energy which was formerly being absorbed and interacting with the dielectric of the first condenser to increase its capacitance is removed from that condenser to now interact with the second to produce this voltage decline and capacity increase. Simply stated then when the light leaves the first condenser to go to the second the dynamic mechanism described causes the charge to follow the light to the second condenser.

The movement of the condensers relative to the light is accomplished in the following manner. These condensers have their reactive dielectric positioned near the focal plane of a solar energy collector and by means of a rotating shaft to which they are attached are alternately moved into then out of that focal plane. First the one condenser then the other receives the full consentration of focusing radiation upon its dielectric. The cycle is repeated with each rotation. At any given instant during the cycle the opposite effects are taking place in each condenser depending upon the particular condenser's position on the rotating shaft at any given instant. A light shield is provided the impede light from the condenser which at a particular instant is rotated away from the concentrated light.

In the principal embodiment of the basic inventive concept the two distinct condensers are firmly connected physically at the point of their electric junction. This is done in a particular design which facilitates high speed rotation of the condensers on a shaft in the focal plane of a parabolic trough solar energy collector. Accordingly, each condenser is in the form of a half cylinder, as is produced when a cylinder is halved by a center cut through the entirety of its length. The half-cylinder shaped condensers are physically and electrically joined to form the shape of a cylinder-shaped condenser combination is rotated rapidly about its longitudinal axis at the focal plane of a parabolic trough.

The plates of these light-variable condensers are in the shape of half-circles. That is they are like thin, flat discs which have been cut through on a dimension close to the diameter. Alternate half circle discs are electrically connected to the half circle disc of the other condenser on the opposite side of the cylinder. While these are physically multiple connections, nevertheless electrically these connections provide one single junction between the two condensers, and when these plates are thereby joined they each take the shape of a disc. All full circle discs are electrically joined together. All half circle discs on one side of the cylinder are electrically connected to form one set of plates for one of the half cylinder condensers. The other set of plates for that condenser is the full circle set of discs just described. The full circle discs are electrically connected together. The half circle discs of the opposite half cylinder condenser are connected together to form one set of plates for that condenser. The other set of plates for that condenser comprises those halves of the full circle discs which extend across the cylinder. The two condensers joined form a cylinder and light is admitted alternately through the light-reactive dielectric medium of one condenser and then of the other as the condenser rotates on its axis along the focal plane of a parabolic trough solar energy collector.

In another embodiment of the basic inventive concept provision is made not only to utilize all collected light energy during every time period of shutter operation but provision is also made that at no time is light or other radiant energy simultaneously incident upon opposite light sensitive dielectrics. In prior embodiments the same beam of light which at a given point in time while leaving one light sensitive dielectric is already beginning to impinge upon the opposite dielectric. This concentration of light energy is then simultaneously illuminating and exciting both the dielectric not yet fully illuminated as well as the dielectric of the other condenser that has just previously been fully illuminated. This means that there is a period of overlap while light moves from one reactive condenser to another, and the detriment of this overlap is that the overlap works against the push pull effect between the two condensers as light cycles back and forth. For instance, the fact that there is still excitation and therefore some state of increased effective dielectric constant in one condenser while the other opposite condenser is being excited means that the condenser from which light is moving away has light upon it which is not doing work but rather that particular portion of the beam is impeding the effect of the other part of the beam already exciting some dielectric in the opposite condenser. This would not be the case if light were instantly switched from one condenser to the other after remaining on each for a short period before moving to the other. To solve this problem of wasted energy from different portions of the light beam striking both condensers phosphors simultaneously during some period of the cycling, this embodiment spacially seperates the two condensers so that there is a brief period for the total beam width to move off of one condenser before striking the other. In this way there is no light maintaining high dielectric constant with larger than necessary capacitance and lower than necessary voltage in the condenser from which light is departing during the time effective dielectric constant is increasing in the opposite condenser. Then to prevent this separation distance from becoming itself a problem of energy waste while the beam is not being used, a separate electric generator exactly like the one described is inserted with its two active condensers in the two spaces between the two condensers of the first condenser. The first two condensers with their transformer are affected by the second set only the way a separating space can affect them. But from the point of view of an energy consideration the combination of the two complete generating circuits means that there is no waste of collected energy due to inefficient shuttering. The collected energy is thereby always acting in a positive manner for power output. In subsequent electric circuitry the energies from each generator may be combined. A way of doing this is to rectify the currents from the transformers' secondaries with full wave rectifiers and add the voltages by putting the outputs in series. Or the rectified currents could be added by placing the outputs in parallel. An alternative for this power summing would be the use of a multiphase transformer receiving both outputs in different time phases to transfer multi phase output power.

Referring now to the drawings, FIGS. 1a, 1b, 1c and 1d are schematics of the prior art showing the basic circuit of a radiation variable capacitor generator.

FIG. 2 of the drawings shows the replacement of the fixed capacitor with a second radiation variable capacitor.

Figure 1A:
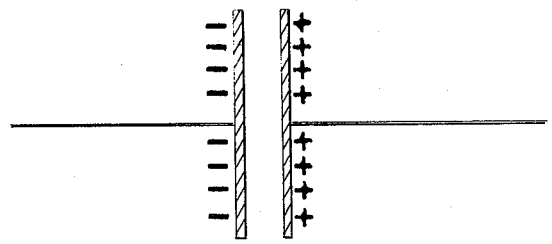
Figure 1B:
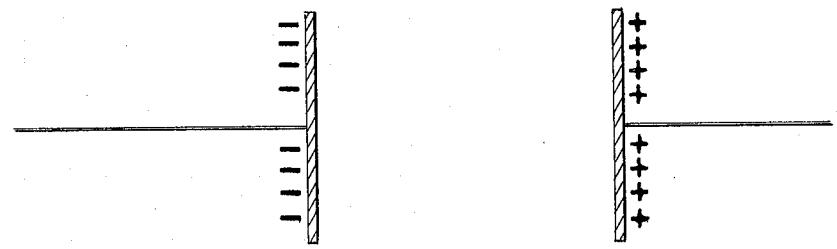

Referring then to FIGS. 1a, 1b, 1c and 1d for a description of the basic physics of the prior art in order to describe its relation to the basic physics of the present invention and especially to show how the physics here differs from that of the former. FIG. 1a illustrates the physics of the electric capacitor by showing an electric capacitor upon which a charge is placed. When opposite electric charges are placed upon opposing capacitor plates and when the source of the charge is removed then the capacitor is left with a given fixed charge. The charge is indeed fixed to a given value. This is because, if the condenser is not connected to anything, then there is no place for the charge to go. There are a certain number of electrons on the negative plate and a certain number of plus charges on the positive plate. No matter what is done to those plates the charge will remain the same as long as no path is provided for the charges to move off of the plates. When the plates of such a condenser are pulled apart as illustrated in FIG. 1b the number of electrons will still remain the same. However, when the plates are pulled apart energy is expended in doing so. But this energy does not add more charge to the capacitor. (There is no place for the larger charge to come from.) What does happen is that voltage increases. It increases firstly because on the negative side electrons can now repel each other with more force because like charges repel each other more when not being attracted as much by the now distant plus charges of the opposite plate. The same increase in voltage takes place as well on the positive plate because positive charges are now repelling each other more when no longer bound as tightly to negative charges since those negative charges are now removed from the proximity of the plus charges. The energy that is put into the isolated capacitor by pulling its plates apart (or by otherwise reducing its capacitance) is due entirely to voltage increase. The idea of isolation of the capacitor is crucial to this mechanism (just as the isolation of two capacitors from a power source will be seen to be essential later).

Now with the charge on the capacitor being constant and its voltage being made to increase as explained, the total energy of the capacitor will increase. Another way of saying this is to say that when the charge is constant and capacitance decreases then voltage and energy increase. That energy increase can be made to do electrical work. One specific way of deriving useful electric work consists in using the increased voltage to produce a current flow.

Figure 1C:
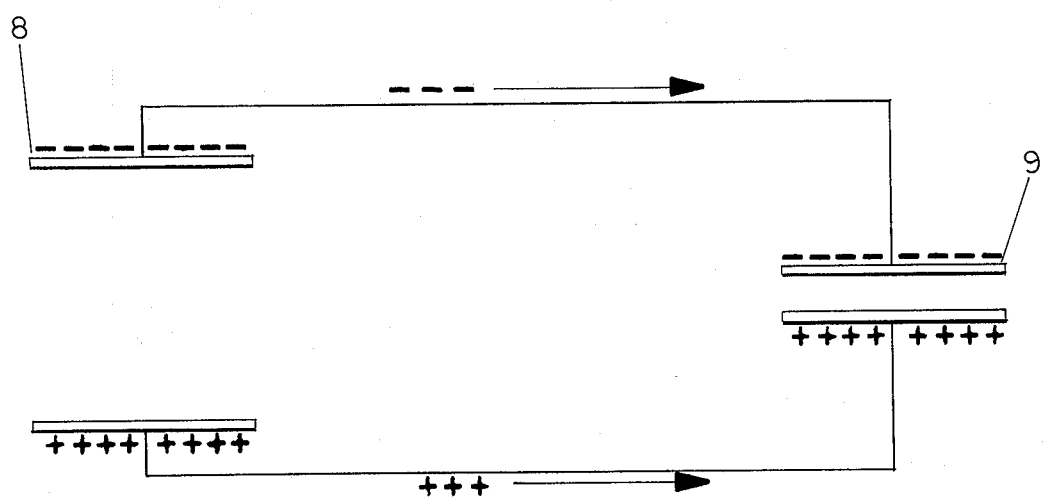

FIG. 1c illustrates such a current flow caused by this kind of capacitance increase. In an isolated system comprised of two capacitors 8 and 9 for which no path is provided for charge to leak off, the changing of the capacitance of one of the capacitors will produce a current flow between the two since the capacitor whose voltage is increasing and whose capacitance is diminishing will cause some of its charge to move to the other capacitor. The total charge of the two together remains the same since as a set they are isolated. (The total charge of the group is not lost nor dissipated by this internal current movement.) The amount of the total charge of the set that is shared by one or other of the two depends upon the relative capacitance of that capacitor in relation to the capacitance of the other. In this FIG. 1c when capacitor 8 has its plates pulled apart its capacitance and voltage increase and some of its charge moves to 9 causing a current flow toward 9. When 8 returns to its former value current flows back to 8 from 9. This fundamental mechanism is the basis of the prior art. This present invention relates to a further dynamics namely that if 8 is decreasing in capacity precisely as 9 is increasing then there is a compounding of potential to move a charge and produce current flow. In the new art 8 increases as 9 decreases in one time period. Then in the next 9 increases as 8 decreases and so on. Since it requires energy to decrease capacitance in an isolated circuit as when pulling the plates apart then energy may be made available from the system. This is done without disturbing the isolated charge on the capacitors by inserting a transformer in series between them. As current moves back and forth between the condensers and through the transformer it provides available work energy from a secondary winding on the transformer without disturbing the required charge isolation of the capacitors. Energy can continually be inserted into this system by pulling the plates of one condenser apart repeatedly or by alternately opening the plates of one while closing partially the plates of the other therefore in this present invention energy is developed by alternately increasing in one while decreasing in the other the capacitance of condensers by exciting the dielectrics first of one then the other with light energy, continually removing light from either while the other is receiving it.

Figure 1D:
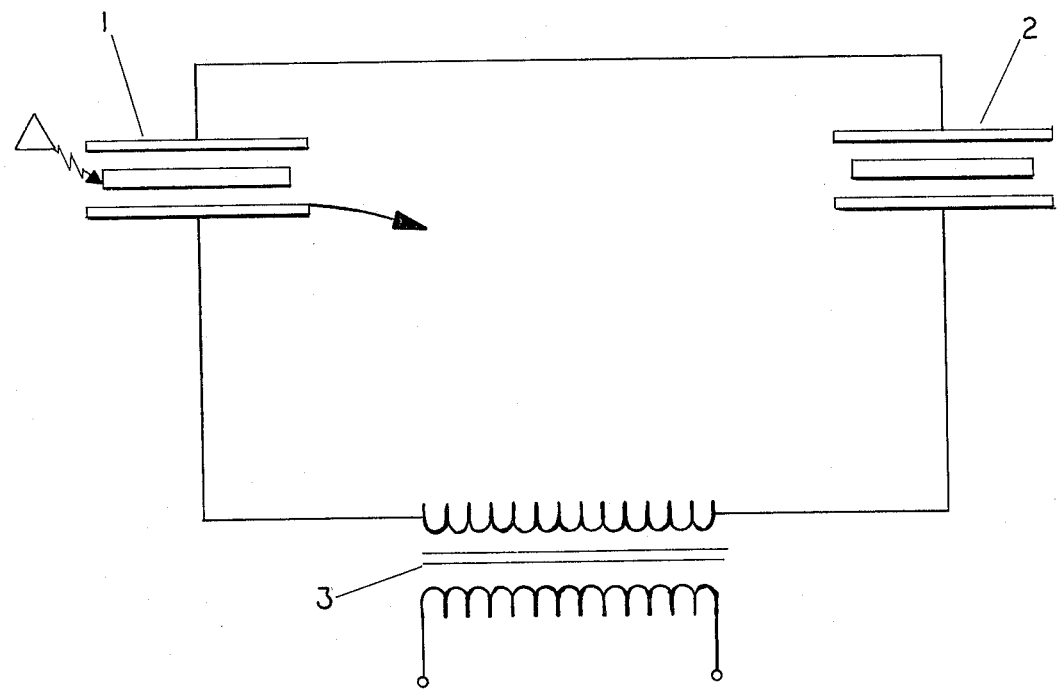

In FIG. 1d intermittent radiation on light sensitive dielectric material changes the capacitance of capacitor 1 so that when light is removed its voltage elevates moving a charge increment to fixed capacitor 2 through transformer 3. The charge increment returns to capacitor 1 when its capacitance is again lowered during the next time period when it again receives radiation.

Figure 2:
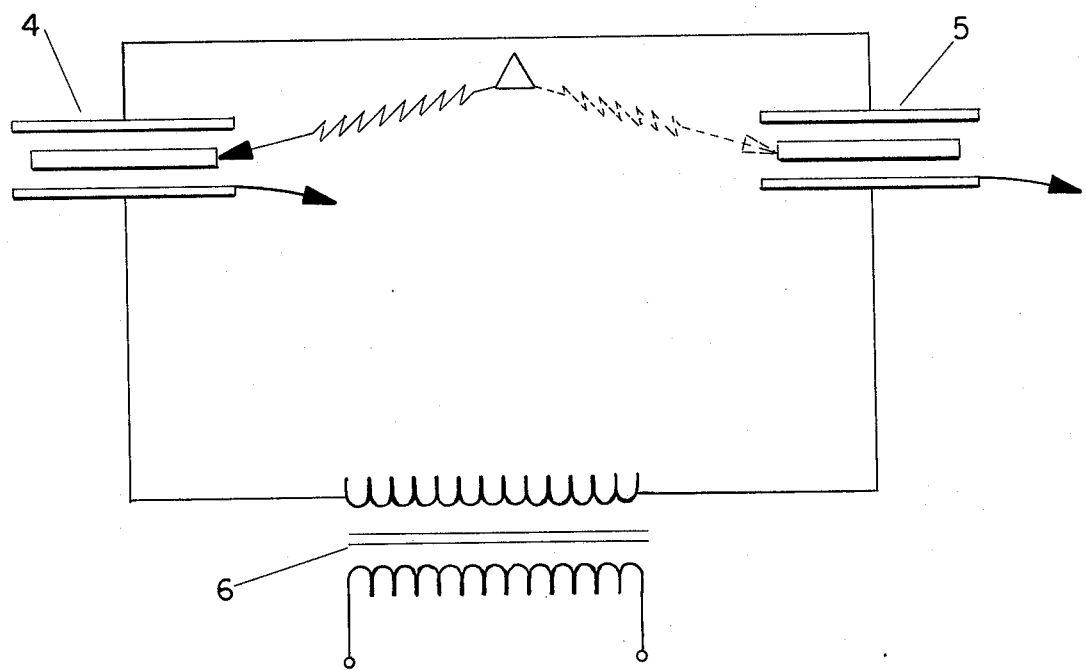

In FIG. 2 intermittent radiation on light sensitive dielectric material changes the capacitance of capacitor 4 so that when light is removed its voltage elevates moving a charge increment to second light-variable capacitor 5 which receives this charge increment across a greater potential difference since in this time period light on its dielectric is increasing its capacitance and lowering its voltage. The charge increment returns from capacitor 5 to capacitor 4 when the voltage of 4 is again in a subsequent time period lowered as it again receives radiation which at that time moved away from 5 leaving 5 with an increasing voltage at that time. The continually moving charge thereby produced cycling back and forth through transformer 6 to induce useful power in its secondary winding.

Figure 3:
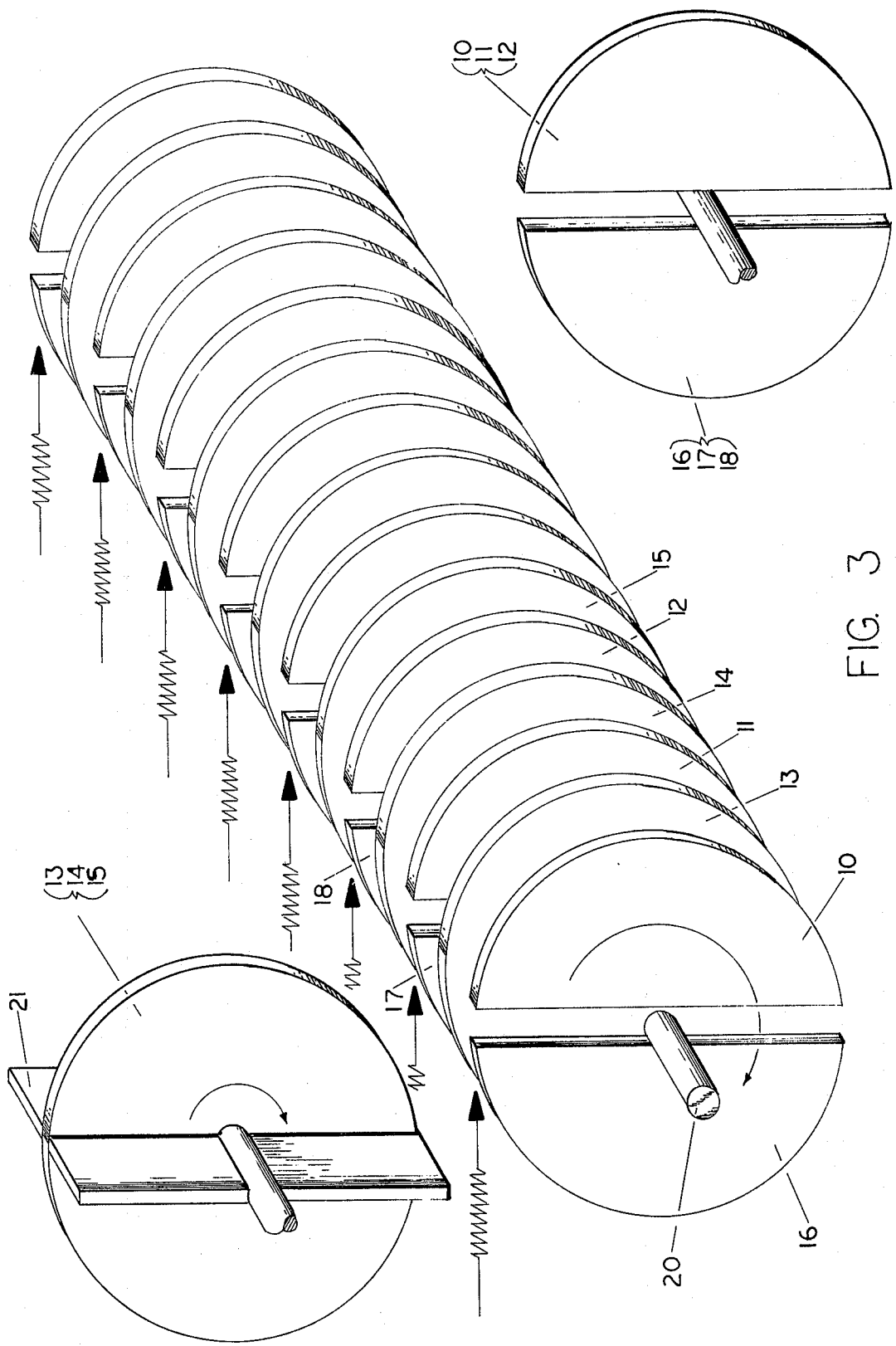
FIG. 3 is a drawing of the twofold rotatable capacitors.

In FIG. 3 the condenser plates 10, 11, 12, are connected to form one element or "plate" of the first condenser. All plates like 10, 11, and 12 that alternate with circular discs are connected together to form the first "plate" or element of the first condenser. Circular discs 13, 14, 15, form the opposite element or "plate" of the first condenser. The second radiation-variable condenser which is on the opposite side of the rotating cylinder is formed from set of connected plates 16, 17, 18, and all other plates on that side which alternate with the circular discs such as 13, 14, and 15. All of the plates like 16, 17, 18, on that side of the cylinder which are not circular discs are connected together to form one element of the second condenser. The other element of the second condenser is formed from the connected plates 13, 14, 15, etc. Both condensers rotate on shaft 20. None of the elements move relative to each other. Shaft 20 rotates on bearings not shown and the cylindrical condenser arrangement is located in the focal plane of a trough-like parabolic solar energy collector or it may rotate before any other radiant energy source used in this art. Between all plates or condenser elements described in this drawing of FIG. 3 there is light or radiation-sensitive dielectric the effective dielectric constant of which changes when radiation is incident upon it and always has a different value under radiation from the value it has when radiation is removed from it. Suitable connecting rings or commutator rings as are known and practiced in the art but which are not shown in the drawing are connected to shaft 20. Three such rings make three respective connections to outside circuitry. One ring provides outside connection for the first condensers plates listed with the described sequence including plates 10, 11, 12, etc. The second ring provides outside connection for all circular disc plates in which both condensers have a common electric connection. A third ring provides outside connection for 16, 17, 18, and all half circle plates described as being connected to them in that condenser. Accordingly the first and the third ring provide for connections to a transformer as shown in schematic of FIG. 2 where each light variable condenser has one connection to its own terminal on its particular side of a transformer winding. The second ring providing the junction where the two condensers are electrically and physically joined provides for contact for the insertion of the high voltage exciting charge when this exciting charge is placed across either condenser using the first and second ring connections or the second and third connections at that time. Again in FIG. 3 the separate disc numbered 13, 14, 15, shows the general appearance of all solid circular discs which are electrically connected. This disc corresponds in appearance to the individual discs numbered individually 13, 14, 15. The light shield 21 is shown attached here to indicate the shielding provided to prevent radiant energy entering the condenser on one side of the cylinder from reaching the condenser on the opposite side during a particular period of rotation. The separate drawing of half-disc 16, 17, 18, merely shows the appearance of the individual discs numbered elsewhere separately as 16, 17, 18. The same is true of the full view of the half-disc numbered 10, 11, 13.

Figure 4:
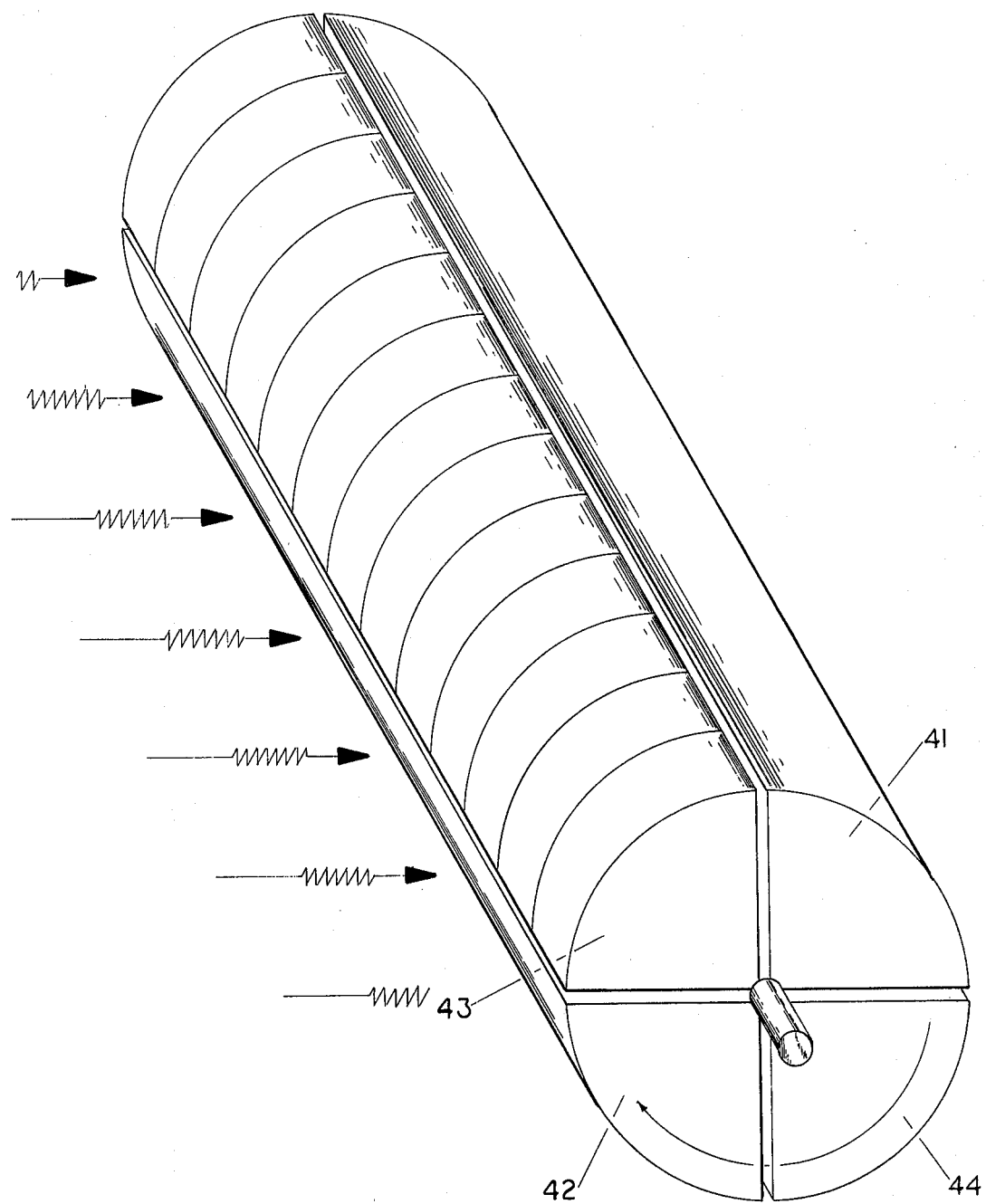
FIG. 4 shows two capacitors of a first genertor set separated by two condensers of a second generator set all rotating together in the form of a cylinder which cylinder is to be placed along the focal plane of a parabolic trough collector.

In FIG. 4 capacitor 41 and 42 are two capacitors of a set. They are each light or radiation variable capacitors. They are part of a cylindrical shaped multiple capacitor unit which rotates on its cylindrical axis along the focal plane of a parabolic light energy consentrator not shown. The electric circuitry for 41 and 42 is that shown in FIG. 2 for condensers 4 and 5. The light-variable capacitors 43 and 44 are a separate set of light variable condensers. They are connected in another separate circuit as illustrated in FIG. 2 for circuitry.

Figure 5:
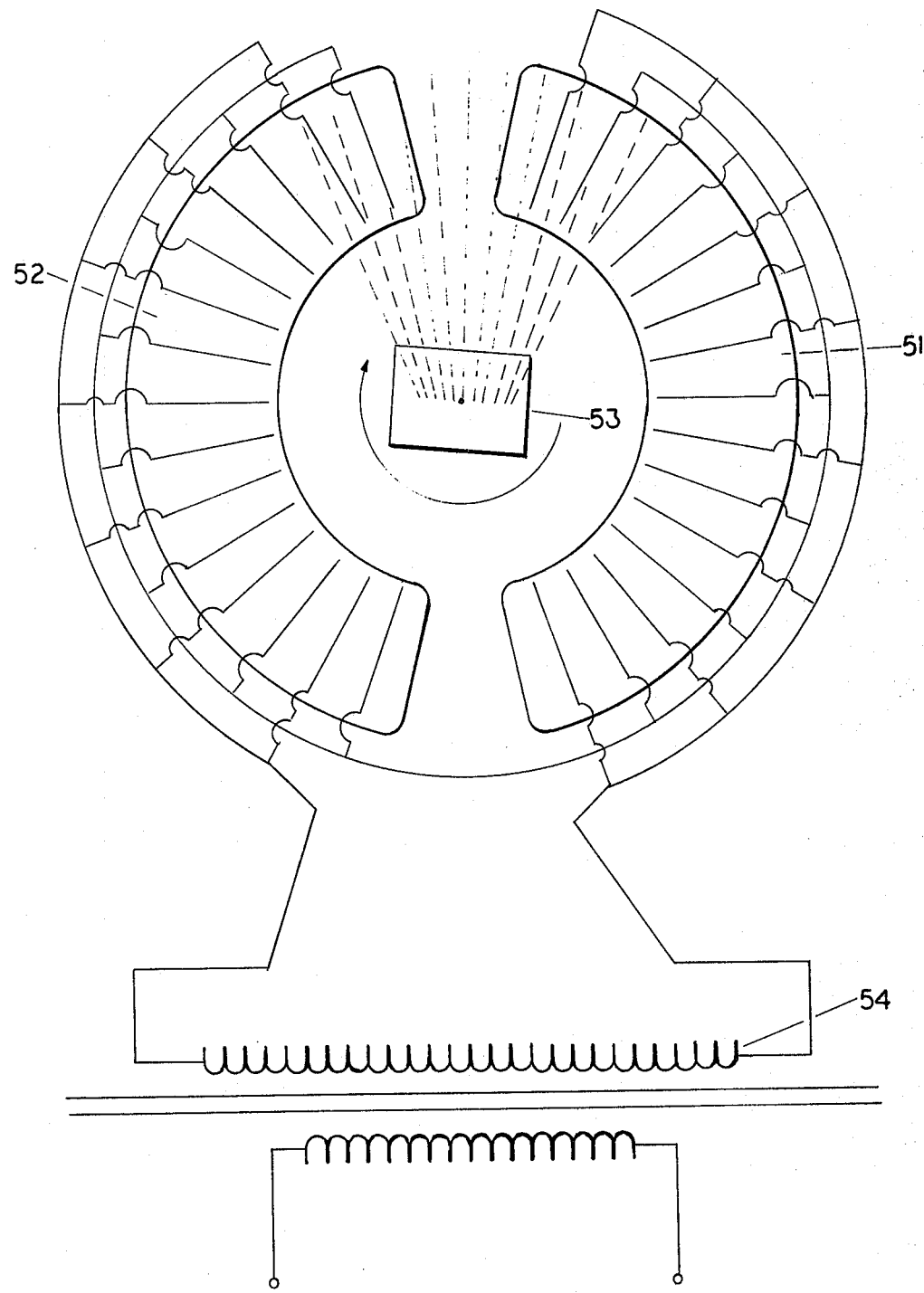
FIG. 5 is a diagramatic drawing of an improveable situation showing a form of wasted energy.

In FIG. 5 there is a diagramatic drawing of an undesirable situation showing a way in which energy is wasted. Semicircular light-variable condenser 51 is receiving light concentrated by a parabolic collector below mirror 53 (as would be seen by looking down into the page) and reflected radially by mirror 53 as it rotates being driven by a small motor not shown. During two periods in each revolution the beam of concentrated energy will be striking both condensers simultaneously i.e. light variable condenser 51 and light variable condenser 52 producing the undesirable condition previously described of a needless depression in the voltage of 52 for a brief period. Transformer 54 serves the same function as transformer 6 in FIG. 2.

Figure 6:
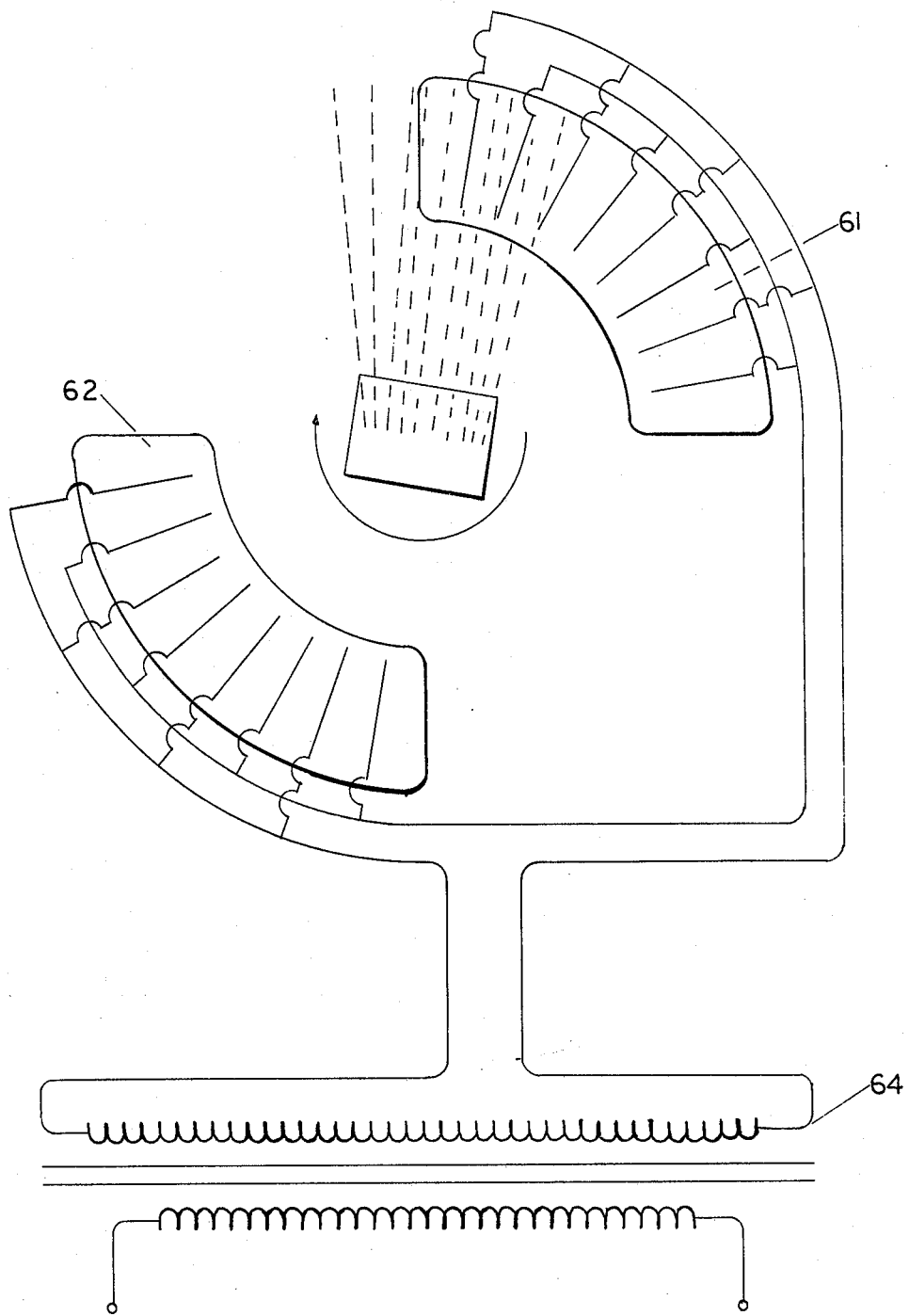
FIG. 6 shows a partial means of correcting the waste depicted in FIG. 5.

In FIG. 6 of the drawings the diagramatic illustration shows how separation space allows the rotating beam to separate from light-variable condenser 61 before the beam strikes the opposite light-variable condenser 62. Separated light active condensers 61 and 62 do not simultaneously receive concentrated light energy reflecting off of mirror 63. Either condenser is completely dark while the other is receiving light. The darkened condenser is thereby only and thoroughly returning to ground state, increasing in voltage while its opposite is being excited, increasing its capacitance to lower its voltage. Transformer 64 serves the same function as transformer 6 in FIG. 2.

Figure 7:
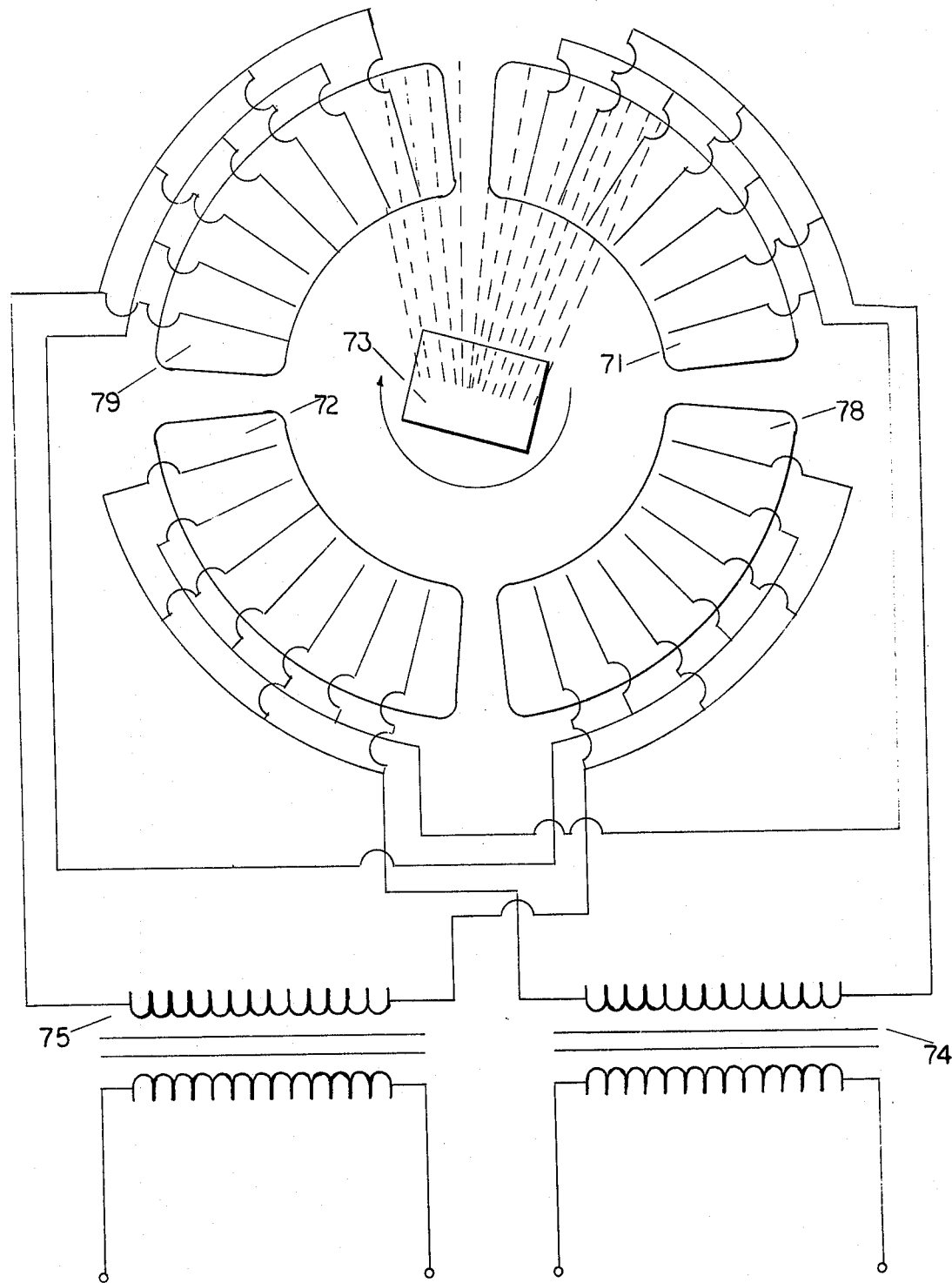
FIG. 7 shows two sets of light variable condensers, each set providing light beam separation for the other.

In FIG. 7 that space which allows the complete separation of the beam of light from one condenser of a set 72 before impinging the opposite of that set 71 is filled with another set of condensers 78 and 79. This insertion of the second set prevents this useful separation space from becoming space in which concentrated light energy is wasted by not striking any reactive surface. Mirror 73 receiving concentrated radiation from below (as would be seen by looking into the page) reflects a light beam radially upon condensers 71, 78, 72, and 79 each in turn so that no two opposite condensers of the same set ever receive light simultaneously. Transformer 74 is in series with set 71 and 72. Transformer 75 is in series with set 78 and 79.

Figure 8:
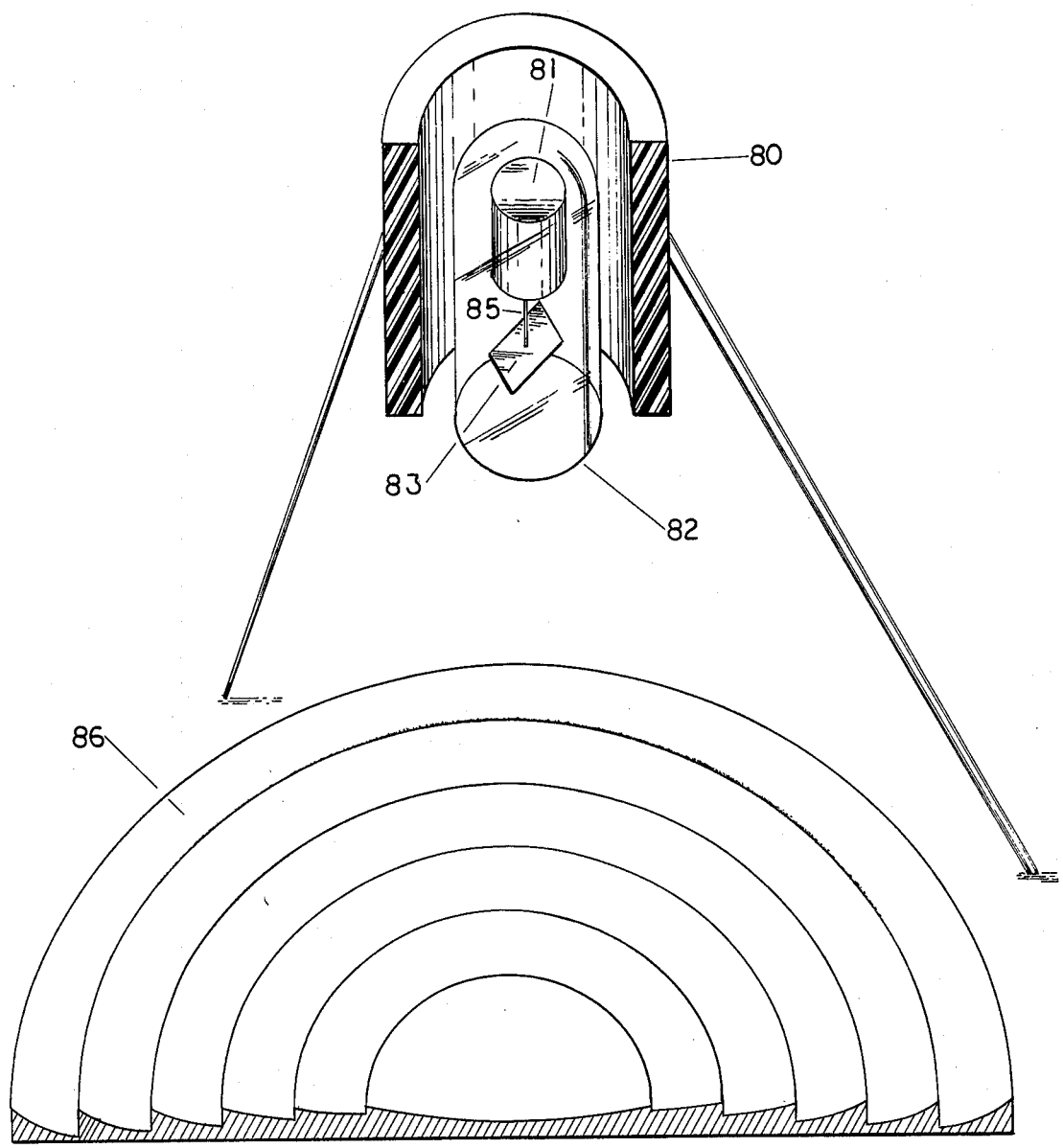
FIG. 8 shows diagramatically the relative positioning and interaction of the functioning elements of an improved generator.

In FIG. 8 two sets of condensers like those of FIG. 7 but not shown here are enclosed in cylinder 80. Motor 81 rotates mirror 83 inside transparent fused quartz globe 82. This globe 82 is evacuated to enable high speed rotation with low air resistance and low power requirement. The mirror 83 is mounted on the verticle motor shaft 85 close to 45° from vertical to provide an approximately horizontal projection of the beam against the light-reactive condensers which condensers radially surround the mirror and are swept by the beam as the mirror rotates. Focusing mirrors 86 in a large area below the rotating mirror focus suns rays upward onto said rotating mirror.

I claim:
1. An improved method of generating electric power from radiant energy comprising:

Periodically changing the effective dielectric constant in two electric condensers' dielectric material, simultaneously elevating the dielectric constant of one while depressing that of the other by causing the periodic increase in the electron polarization of one condenser while simultaneously causing the decrease in electron polarization of the opposite condensers' dielectric by the periodic admission of electromagnetic radiation first to the one condensers' dielectric then to the others dielectric and by alternating periods of admission and exclusion of radiation to each condenser, one receiving it while the other does not, employing a set of two such condensers constantly changing in opposite directions from each other with respect to their dielectric constants when under the influence of radiation that cycles back and forth from the dielectric of one to the dielectric of the other in a series electric circuit with a transformer, placing a charge on the condensers occasionally and removing the source of the charge, continuously cycling said required radiation back and forth from one radiation sensitive dielectric to the other, removing useful electric power from the secondary winding of said series connected transformer.

2. A method of generating electricity as in claim 1 in which the source of radiation is solar radiation and the means of concentrating the solar energy is an area of mirrors concentrating or focusing sunlight on a revolving mirror.

3. A method of generating electricity as in claim 1 in which the continuous cycling of radiation back and forth from one dielectric to the other is accomplished by a mirror rotating in a vacuum contained in a transparent vessel and said mirror sweeping the beam of light in a circle alternately illuminating one light sensitive condenser and then the other said condensers being placed alternately along the circumference of the circle swept by the beam.

4. A method of generating electric power as in claim 1 in which two such sets each having two condensers and a transformer in series are combined in such a way that a single beam of light is never incident upon two condensers of the same set at the same time, this being accomplished by alternating placement of a condenser from one set then a condenser from another set before the moving beam.

5. A method of generating electricity as in claim 1 in which the continuous cycling of radiation from one condenser to another is accomplished by having the light-reactive condensers rotate on opposite sides of an axle which axle rotates along the focal plane of a parabolic trough collector.

6. A method of generating electricity as in claim 1 in which two such units each having two condensers and a transformer are combined in such a way that a condenser from one set follows a condenser from another set as these condensers are mounted about the axis of a cylinder that revolves along the focal plane of a parabolic trough collector so that the concentration of light from the collector is never striking two condensers from the same set at the same time.

* * * * *